UNITED STATES PATENT OFFICE.

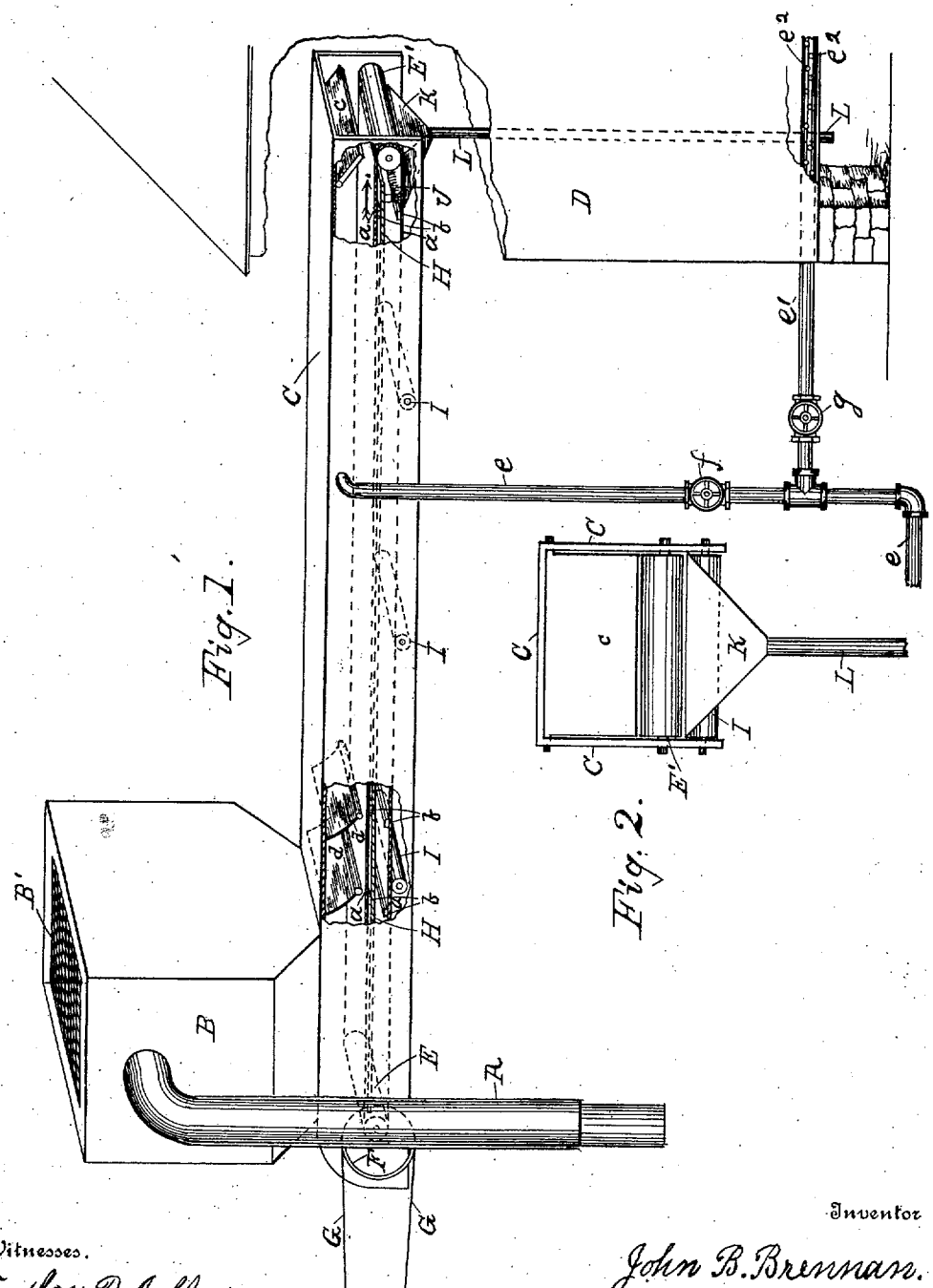

JOHN B. BRENNAN, OF SHERMAN, TEXAS.

APPARATUS FOR BLEACHING SEED-COTTON.

No. 884,359.      Specification of Letters Patent.      Patented April 14, 1908.

Application filed October 5, 1907. Serial No. 396,106.

*To all whom it may concern:*

Be it known that I, JOHN B. BRENNAN, a citizen of the United States, residing at Sherman, in the county of Grayson and State of Texas, have invented certain new and useful Improvements in Apparatus for Bleaching Seed-Cotton, of which the following is a specification.

This invention pertains to an apparatus and process of treating seed cotton as it passes from wagons to the cotton storage house, or after the cotton has been deposited in bins within the house, to bleach or whiten the same; and relates particularly to means for subjecting the cotton to the action of a gaseous medium which will operate to bleach or whiten the same, thus increasing the market value thereof.

The bleaching medium employed may be atmospheric air which has been subjected to the action of an arc or flaming discharge of electricity, sulfur fume or other suitable bleaching compound, produced either by electrical or chemical means.

The object of this invention is not to claim broadly any particular bleaching compound, but to provide means by which any suitable or well known bleaching medium may be brought in contact with seed cotton, subjecting it to the action of the bleaching element for regular predetermined intervals as it is carried along within a conveyer, or after it has been deposited in bins within a storage house.

In former applications filed by me, one on the 28th. day of May, 1907, Serial No. 376,183, and the other filed on the 15th. day of July, 1907, Serial No. 383,753, apparatus for bleaching lint cotton as it passes from gins is described and shown, but these do not include means for bleaching seed cotton. It is the object, therefore, of the present application to include this feature. By bleaching cotton before it is ginned the beneficial effects are shown not only on the lint, but also on the linters, hulls and meats, giving all, at one operation, a more desirable color and proportionately increasing their market value.

In order that the invention may be clearly understood, I have illustrated in the accompanying drawing apparatus for carrying out my process.

In the said drawing, Figure 1, is a perspective view in elevation of the device, and Fig. 2, an enlarged end view of the conveyer taken from the right of Fig. 1.

By reference to the aforesaid Fig. 1, A indicates a flue through which cotton is drawn from wagons by suction in the usual manner and deposited in the receiving box B; the air passing out through the screened top B'. On account of danger from fire a cotton storage house is usually placed about one hundred feet from the gin, and the receiving box B is preferably located outside, and adjacent to the gin building, at some distance from the ground.

C is a conveyer box, upon one end of which the receiving box rests; the other end of the conveyer extends to within the storage house D as shown, thus providing a conveyer of considerable length; and within it, near the ends are mounted for rotation rollers E and E' that extend transversely from one side of the conveyer to the other and in which opposite sides they are journaled; they carry an endless apron *a* that travels horizontally in the direction indicated by the dart; motion being imparted to it through pulley F secured to roller E, and driven from any convenient point by belt G. In lieu of rollers, pulley and belt, sprocket wheels and chain may be used.

The endless apron would preferably be made of thin, narrow slats of wood secured in a suitable manner to link chains or strips of leather, the slats being spaced a slight distance apart to admit of the passage of dirt or any foreign matter that would be sifted from the cotton in its passage through the conveyer. The upper fold of apron *a* drags along upon the floor or bottom H that extends nearly from one end to the other of the conveyer; the bottom fold of apron is carried by rollers I arranged at suitable distances apart.

*b* are slats secured at regular intervals to the inner side of apron *a*, and when the apron is traveling they drag along upon the bottom H carrying the dirt that sifts through the apron to the end of bottom, whence it drops to the slats of the lower fold of apron *a* and is carried back to the brush J which causes it to pass between the slats of apron *a* and into the hopper K, which conducts it through pipe L to a waste pile or other suitable place of deposit. *c* is a leaf of wood or metal, hinged to the sides of the conveyer near the top, fitting loosely within same, and when cotton is carried against it by the apron it rises sufficiently to admit of the cotton passing, but not enough to permit the free escape of gas or other bleaching element from within the conveyer. $d\ d$ are similar leaves secured within the conveyer near the opposite end thereof, they are preferably made of heavy canvas, or other flexible material, with a rod extending across the lower edge of each to weight them down and close the space within the conveyer between the apron and top, thus guarding against the free exit of gas from this end. $e$ is a pipe having its upper end opening into the conveyer C between the floor and top thereof; the lower end branches to the left and is connected with the source of supply of the bleaching medium (not shown) that may be stationed at any convenient point. The branch $e'$ leads into one or more bins in the cotton house D, near the floor and is provided with perforations $e^2$ for admitting bleaching fluid within the bins. The valves $f$ and $g$, control the supply to either the bins or conveyer.

The cotton to be treated is delivered under the flue A, through which it is drawn by suction in the usual manner into the receiving box B; this box having no bottom, permits of the cotton dropping upon the top of traveling apron $a$ by which it is carried horizontally through the length of the conveyer C to the opposite end, where it drops into a bin in the cotton house D; the valve $f$ being open, and valve $g$ closed, the space in the conveyer C between the floor H and top is filled with a bleaching element which whitens the lint and other properties of seed cotton as it passes along. Considerable dirt and other foreign matter will be sifted from the cotton during its passage through the conveyer C, all of which will pass between the slats comprising the apron $a$ to the floor H, along which it is scraped to the end of the floor by the transverse slats $b$, whence it falls to the lower fold of the apron $a$ and is carried back to the brush J that sweeps it from the slats through which it falls into hopper K, whence it is conducted by pipe L to any convenient place.

Cotton may be deposited by my conveyer, or by other means in bins within the house D, and there subjected to the bleaching element at any convenient time by closing valve $f$ and opening valve $g$, thus conducting the bleaching compound to the cotton bins.

I do not claim any particular bleaching compound, or any particular method of producing the same; but What I do claim and desire to secure by Letters Patent of the United States, is—

1. The combination with a cotton receiving receptacle, of a casing extending from such receptacle to a place of storage, an open-work conveyer in said casing to act as a sifter for the cotton during its travel thereon, means for conducting off the waste matter sifted from the cotton, flexibly arranged closures to partition off a portion of the conveyer, and means for supplying a bleaching agent to the portion of the conveyer so partitioned off.

2. A bleaching apparatus comprising a receptacle to receive the material, a casing leading from said receptacle, a conveyer in said receptacle, flexibly mounted closures in the casing to partition off a portion of the conveyer, and means for supplying a bleaching agent to the portion of the conveyer so partitioned off.

3. A bleaching apparatus comprising a receptacle, a casing leading from said receptacle, a conveyer in said casing, said conveyer adapted to sift the material in its passage thereover, means to convey off such siftings, means for supplying a bleaching agent to the conveyer, and means to prevent the free escape of the bleaching agent from the conveyer.

In testimony whereof I affix my signature in presence of two witnesses.

JON. B. BRENNAN.

Witnesses:
WESLEY P. JOLLEY,
WILLIS KIDD.